(12) United States Patent
Zeidman

(10) Patent No.: US 7,882,488 B2
(45) Date of Patent: *Feb. 1, 2011

(54) SOFTWARE TOOL FOR SYNTHESIZING A REAL-TIME OPERATING SYSTEM

(75) Inventor: Robert M. Zeidman, Cupertino, CA (US)

(73) Assignee: Robert Zeidman, Cupertino, CA (US)

( * ) Notice: Subject to any disclaimer, the term of this patent is extended or adjusted under 35 U.S.C. 154(b) by 655 days.

This patent is subject to a terminal disclaimer.

(21) Appl. No.: 10/688,573

(22) Filed: Oct. 20, 2003

(65) Prior Publication Data

US 2005/0086030 A1 Apr. 21, 2005

(51) Int. Cl.
G06F 9/44 (2006.01)
G06F 9/46 (2006.01)

(52) U.S. Cl. .................................. 717/106; 718/102
(58) Field of Classification Search .................. 717/106, 717/107, 108, 109

See application file for complete search history.

(56) References Cited

U.S. PATENT DOCUMENTS

| | | | | |
|---|---|---|---|---|
| 4,796,179 | A * | 1/1989 | Lehman et al. | 700/86 |
| 5,995,745 | A * | 11/1999 | Yodaiken | 703/26 |
| 6,671,745 | B1 * | 12/2003 | Mathur et al. | 719/328 |
| 2004/0045003 | A1 * | 3/2004 | Lake | 718/103 |

OTHER PUBLICATIONS

Jia Xu et al., On Satisfying Timing Constraints in Hard-Real-Time Systems, 1991, ACM.*
C. L. Liu, Scheduling Algorithms for multiprogramming in a Hard-Real-Time Environment, Jan. 1, 1973, ACM.*
Desmet et al., Operating System based Software Generation for System-on-Chip, 2000, ACM, pp. 396-401.*
Desmet et al., Timed Executable System Specification of an ADSL Modem using a C++ based Design Environment: A Case Study, 1999, ACM, pp. 38-42.*
Verkest et al, On the use of C++ for system-on-chip design, 1999, IEEE, pp. 1-6.*
Gauthier et al., "Automatic Generation and Targeting of Application Specific Operating Systems and Embedded Systems Software", 2001, IEEE, pp. 679-685.*
Stewart et al., "The Chimera Methodology: Designing Dynamically Reconfigurable Real-Time Software using Port-Based Objects", 1995, IEEE, pp. 46-53.*
Liu et al., "Timed Multitasking for Real-Time Embedded Softwaer", Feb. 2003, IEEE, pp. 65-75.*
Kuljeet Singh 'Design and Evaluation of an Embedded Real-time Micro-kernel', Oct. 2002, Virginia Polytechnic Institute and State University, pp. 1-133.*
Shau Gal-Oz, "Standard API Would Significantly Accelerate Embedded System Development", Mar. 1999, Aisys, pp. 81-89.*

* cited by examiner

Primary Examiner—Michael J Yigdall
Assistant Examiner—Ben C Wang
(74) Attorney, Agent, or Firm—Jim H. Salter

(57) ABSTRACT

A tool for developing software source code for embedded systems that allows the user to automatically generate a real-time operating system for scheduling of multi-tasking operations while preventing deadlocks between the real-time tasks. The tool takes parameters that let the user assign priorities and timing characteristics to different tasks and to experiment with different scheduling algorithms.

24 Claims, 16 Drawing Sheets

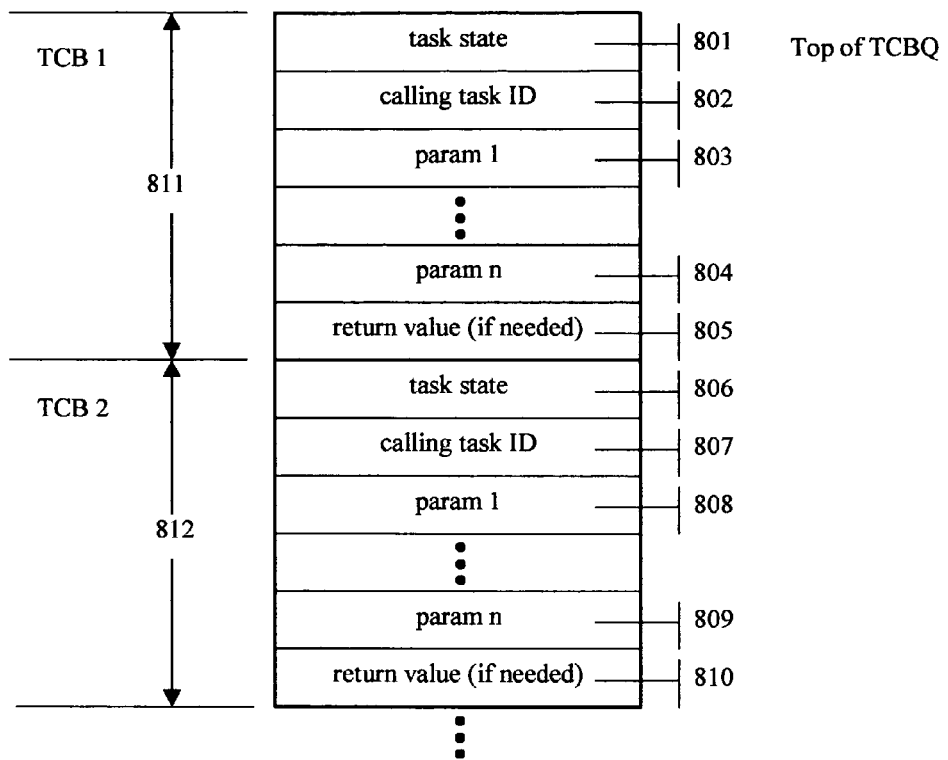

Figure 8

| | |
|---|---|
| SynthOS_X_write(SynthOS_taskx_TCBQ, n, x); | Writes value x to n positions below top of TCBQ for task x |
| SynthOS_X_write_next(SynthOS_taskx_TCBQ, x); | Writes value x to next empty position in TCBQ for task x |
| SynthOS_X_read(SynthOS_taskx_TCBQ, n, x); | Reads value x from n positions below top of TCBQ for task x |
| SynthOS_X_discard(SynthOS_taskx_TCBQ, n); | Pops n locations off top of TCBQ, discards values popped, writes first location with 0 |

Figure 9

```
// The main polling loop begins here
while (1)                                                          1305
{
    /*******************************/
    /***** EXECUTE F-LOOP TASKS *****/
    /*******************************/

// Decrement the loop counter for f-loop task 1
    FLoopCount1--;
    if (FLoopCount1 == 0)
    {
        // Execute f-loop task1
        FloopTask1();

// Set the f-loop task 1 loop counter to its maximum
        FLoopCount1 = SYNTHOS_FLOOPTASK1_FREQ;
    }                                                              1306

// Decrement the loop counter for f-loop task 2
    FLoopCount2--;
    if (FLoopCount2 == 0)
    {
        // Execute f-loop task2
        FloopTask2();

// Set the f-loop task 2 loop counter to its maximum
        FLoopCount2 = SYNTHOS_FLOOPTASK2_FREQ;
    }
```

Figure 13b

```
/ *******************************/
/ ***** EXECUTE P-LOOP TASKS *****/
/ *******************************/

// Check status of p-loop task 1 from its TCB
SynthOS_X_read(SynthOS_PLoopTask1_TCBQ, 0,
    SynthOS_task_status);
// If task is not idle, execute it
if (SynthOS_task_status != SYNTHOS_TASK_IDLE)
    PLoopTask1();

// Check status of p-loop task 2 from its TCB
SynthOS_X_read(SynthOS_PLoopTask2_TCBQ, 0,
    SynthOS_task_status);
// If task is not idle, execute it
if (SynthOS_task_status != SYNTHOS_TASK_IDLE)
    PLoopTask2();

/ *******************************/
/ ***** EXECUTE CALL TASKS *****/
/ *******************************/

// Execute all call tasks from highest priority to lowest

// Read the status of call task 1 from its TCB
SynthOS_X_read(SynthOS_CallTask1_TCBQ, 0, SynthOS_task_status);
// If task is not idle, execute it
if (SynthOS_task_status != SYNTHOS_TASK_IDLE)
    CallTask1();

// Read the status of call task 2 from its TCB
SynthOS_X_read(SynthOS_CallTask2_TCBQ, 0, SynthOS_task_status);
// If task is not idle, execute it
if (SynthOS_task_status != SYNTHOS_TASK_IDLE)
    CallTask2();
    }
}
```

```
// SynthOS timer ISR include "SynthOS_globals.h"

timer()
{
    // Decrement the p-loop task 1 counter
    PLoopTask1Counter--;
    // Check to see if it is time to execute p-loop task 1
    if (PLoopTask1Counter == 0)
    {
        // Put a new TCB in the TCBQ for task 1
        // Put task 1 into initial state 1
        SynthOS_X_write_next(SynthOS_PLoopTask1_TCBQ, 0, 1);
        SynthOS_x_write_next(SynthOS_PLoopTask1_TCBQ, 1, TIMER_ID);
        SynthOS_x_write_next(SynthOS_PLoopTask1_TCBQ, 2, a);
        SynthOS_x_write_next(SynthOS_PLoopTask1_TCBQ, 3, b);
        SynthOS_x_write_next(SynthOS_PLoopTask1_TCBQ, 4, c);

// Set the p-loop task 1 counter to its maximum
        PLoopTask1Counter = SYNTHOS_PLOOPTASK1_PERIOD;
    }

// Decrement the p-loop task 2 counter
    PLoopTask2Counter--;
    // Check to see if it is time to execute p-loop task 2
    if (PLoopTask2Counter == 0)
    {
        // Put a new TCB in the TCBQ for task 1
        // Put task 1 into initial state 1
        SynthOS_X_write_next(SynthOS_PLoopTask2_TCBQ, 0, 1);
        SynthOS_x_write_next(SynthOS_PLoopTask2_TCBQ, 1, TIMER_ID);

// Set the p-loop task 2 counter to its maximum
        PLoopTask2Counter = SYNTHOS_PLOOPTASK2_PERIOD;
    }
}
```

Figure 14a

```
/ ***********************************/
/ ***** EXECUTE PREEMPTIVE TASKS *****/
/ ***********************************/

// Execute and pause execution of preemptive tasks

// Decrement the timer loop counter for preemptive task 1
PreemptiveTask1Counter--;
// Is it time to start executing the task?
if (PreemptiveTask1Counter == SYNTHOS_PREEMPTIVETASK1_ONTIME)
   ContextSwitchIn(PreemptiveTask1());
// Is it time to pause executing the task?
if (PreemptiveTask1Counter == SYNTHOS_PREEMPTIVETASK1_OFFTIME)
   ContextSwitchOut(PreemptiveTask1());
// When counter reaches zero, reset it to its maximum
if (PreemptiveTask1Counter == 0)
   PreemptiveTask1Counter = SYNTHOS_PREEMPTIVETASK1_MAXCOUNT;

// Decrement the timer loop counter for preemptive task 2
PreemptiveTask2Counter--;
// Is it time to start executing the task?
if (PreemptiveTask2Counter == SYNTHOS_PREEMPTIVETASK2_ONTIME)
   ContextSwitchIn(PreemptiveTask2());
// Is it time to pause executing the task?
if (PreemptiveTask2Counter == SYNTHOS_PREEMPTIVETASK2_OFFTIME)
   ContextSwitchOut(PreemptiveTask2());
// When counter reaches zero, reset it to its maximum
if (PreemptiveTask1Counter == 0)
   PreemptiveTask1Counter = SYNTHOS_PREEMPTIVETASK1_MAXCOUNT;
}
```

SOFTWARE TOOL FOR SYNTHESIZING A REAL-TIME OPERATING SYSTEM

CROSS-REFERENCE TO RELATED PATENT APPLICATION

The present application relates to copending U.S. patent application, entitled "Visual Tool for Developing Real Time Task Management Code," Ser. No. 09/309,147, filed on May 10, 1999.

BACKGROUND OF THE INVENTION

1. Field of the Invention

The present invention relates to tools for software development. In particular, the present invention relates to a tool for developing real-time software for embedded systems.

2. Discussion of the Related Art

In a typical real-time system, the central processing unit (CPU) performs a number of response time-critical tasks according to a schedule controlled by a kernel of a real-time operating system (RTOS). In accordance with the schedule, each task is allocated a limited amount ("slice") of time, so that no single task can hoard the CPU—a scarce resource—to the detriment of other tasks. The time allocated to a given task can vary according to the scheduling algorithm that takes into account the priority of each task. Kernels of RTOSes are available commercially from a number of vendors.

FIG. 1 is a block diagram of an embedded system 100. Embedded system 100 includes task management code in the form of an RTOS kernel 101 that controls the scheduling of a number of tasks 102-106 through interfaces 107-111, respectively, called "system calls." An RTOS often includes a kernel plus hardware driver tasks and other common tasks. An example of a task is a routine for calculating the pixel information for an on-screen display and sending that information to a display driver. System calls 107-111 are each a small program section of the task that communicates with the RTOS kernel 101. System calls 107-111 conform to the requirements of RTOS kernel 101. RTOS kernel 101 allocates time slices and assigns a priority to each task, and activates or deactivates a task through the associated interface according to the time slices and the priority assigned. For example, kernel 101 ensures that an interrupt service task begins execution within a predetermined maximum latency time after an interrupt.

Kernel 101 is also responsible for such "house-keeping" tasks as garbage collection and memory management.

A second embedded system is shown by the embedded system 200 in FIG. 2. In embedded system 200, RTOS kernel 101 in FIG. 1 has been replaced by the RTOS polling loop 201 that performs the task management. A polling loop is also called a cyclic executive. An RTOS polling loop is typically created by a system programmer for a specific application.

To implement embedded system 200, the system programmer provides RTOS polling loop 201 and system calls included in the program code of each of interface 207-211 of tasks 202-206. Typically, task scheduling using a polling loop is simpler than that provided in RTOS kernel 101 and thus requires less memory space for task management code. Furthermore, system calls 207-211 tend to be simpler, and thus the code tends to be smaller, than code for system calls for an RTOS kernel and thus require less memory.

SUMMARY OF THE INVENTION

The present invention creates a "synthesized" RTOS by automating the process of creating task management source code, so that many features of an off-the-shelf RTOS kernel or custom RTOS polling loop are achieved. These features include, but are not limited to, insulating the intricacies of task management from the program code that implements the individual tasks and providing general ease of use for the programmer. By including only necessary code in the synthesized RTOS, the synthesized RTOS has several cost advantages over commercial off-the-shelf RTOSes. These advantages include, but are not limited to, simplicity, small memory footprint, and reliance on simple and thus inexpensive processors. Because the synthesized RTOS can be optimized for a particular hardware platform, a particular microprocessor, and particular system requirements, the synthesized RTOS has additional performance advantages over commercial off-the-shelf RTOSes. These advantages include, but are not limited to, faster context switching times, ability to prevent deadlocks, race conditions, and other hazards, and higher overall performance.

In one embodiment, the synthesized RTOS includes a timing analysis module that provides estimates of response latency. In addition, the synthesized RTOS includes a library of prepackaged tasks, including such housekeeping tasks as disk defragmentation or garbage collection, which can be selectively included in the polling loop. Additional prepackaged tasks include a TCP/IP stack for Internet communication, and drivers for standard hardware devices such as keyboards, monitors, serial ports, parallel ports, Ethernet ports, and so on.

According to one aspect of the present invention, a method is provided for developing a real-time task management system, which includes the steps of: a) providing commands to be used in the source code of real-time tasks, these commands being designed to provide synchronization among the real-time tasks; b) synthesizing source code for controlling a polling loop including the real-time tasks; c) synthesizing source code for the commands used in the real-time tasks; and d) compiling the synthesized source code for controlling said polling loop and the source code for the tasks that include the synthesized source code for the commands.

In the above-discussed method, some of the commands used in the real-time tasks specify: a) starting execution of another real-time task and waiting for it to complete; b) starting execution of another real-time task and not waiting for it to complete; c) reporting the execution state of another real-time task; d) waiting for the completion of another real-time task; or e) waiting for the occurrence of a real-time event.

In one embodiment, each task is assigned a priority to allow the task management code to determine which of multiple tasks that are waiting to execute should be executed first. Because the synthesized code is synthesized taking into consideration task priorities, deadlocks are prevented by design.

The task management code of the present invention can be used to provide interrupt tasks.

Further features and advantages of various embodiments of the present invention are described in the detailed description below, which is given by way of example only.

BRIEF DESCRIPTION OF THE DRAWINGS

The present invention will be understood more fully from the detailed description given below and from the accompanying drawings of the preferred embodiment of the invention, which, however, should not be taken to limit the invention to the specific embodiment but are for explanation and understanding only.

FIG. 8 is a diagram of the structure of the task context blocks (TCB) and the TCB queue (TCBQ) as they are stored in memory.

FIG. 9 is a table of software routines used by the present invention to manipulate TCBs and TCBQs.

FIG. 14 (parts a and b) shows synthesized timer interrupt ISR code.

DETAILED DESCRIPTION

The present invention will be understood more fully from the detailed description given below and from the accompanying drawings of the preferred embodiment of the invention, which, however, should not be taken to limit the invention to the specific embodiment but are for explanation and understanding only.

Figure 1:
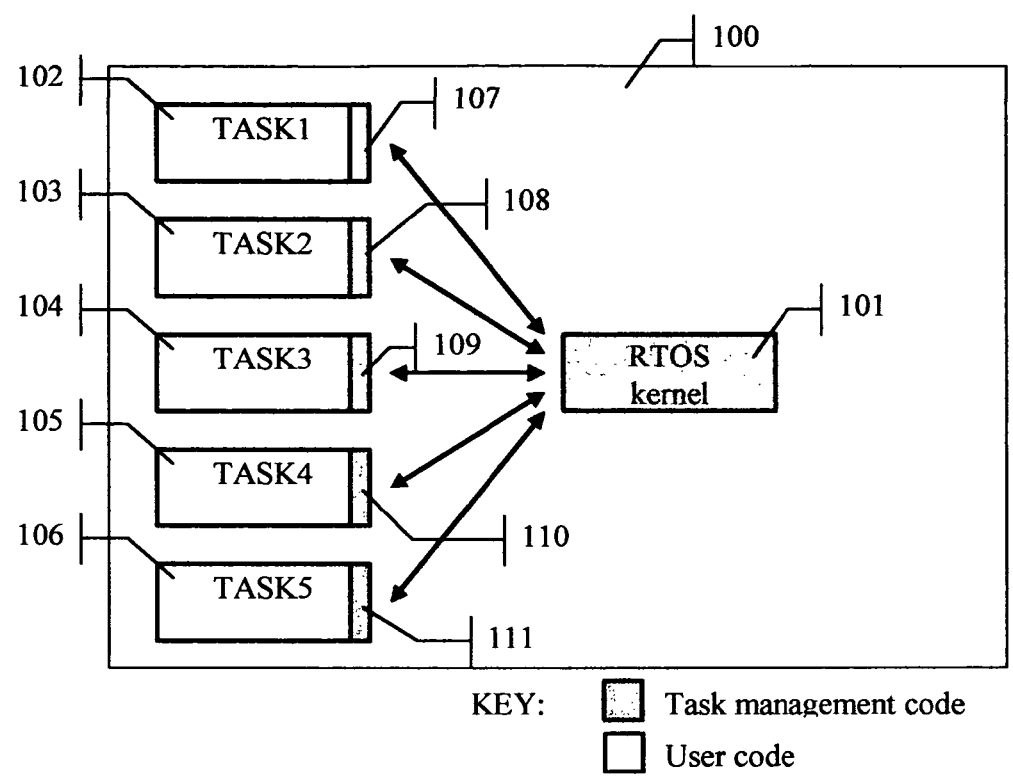
FIG. 1 is a block diagram of an embedded system 100 for managing tasks 102 through 106 using an RTOS kernel 101 for task management.
Figure 2:
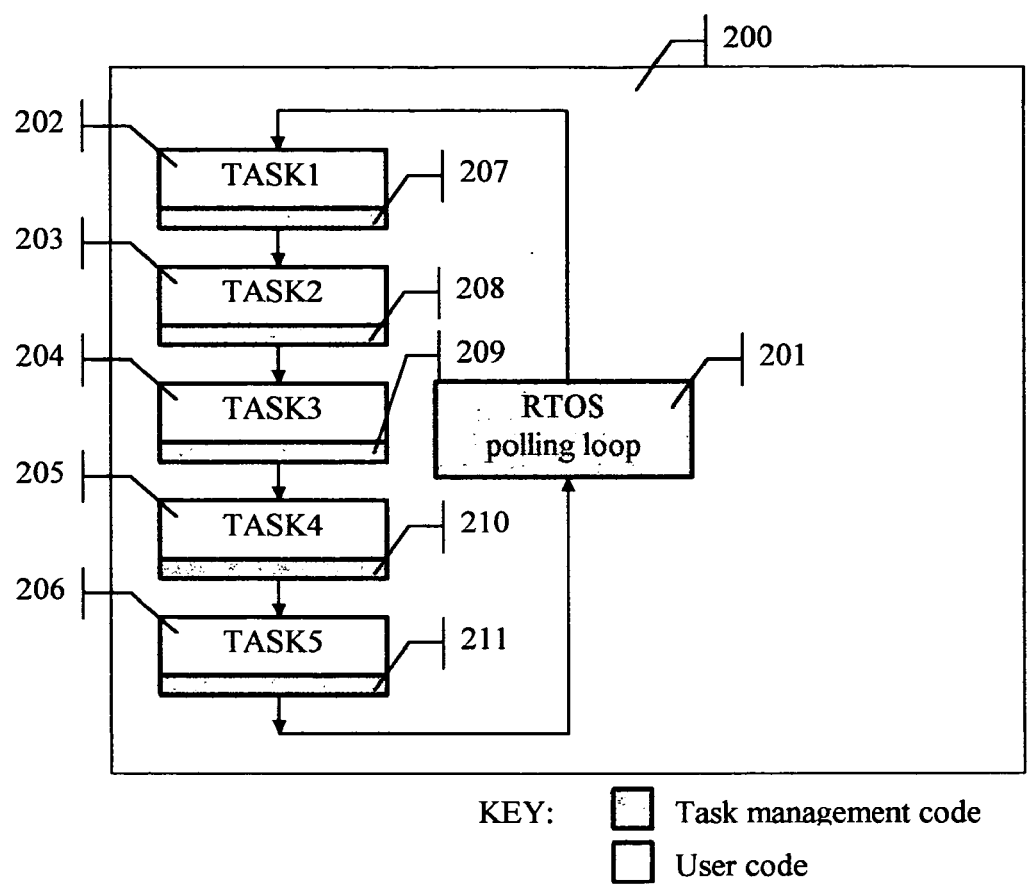
FIG. 2 is a block diagram of an embedded system 200 for managing tasks 202 through 206 using an RTOS polling loop 201 for task management.
Figure 3:
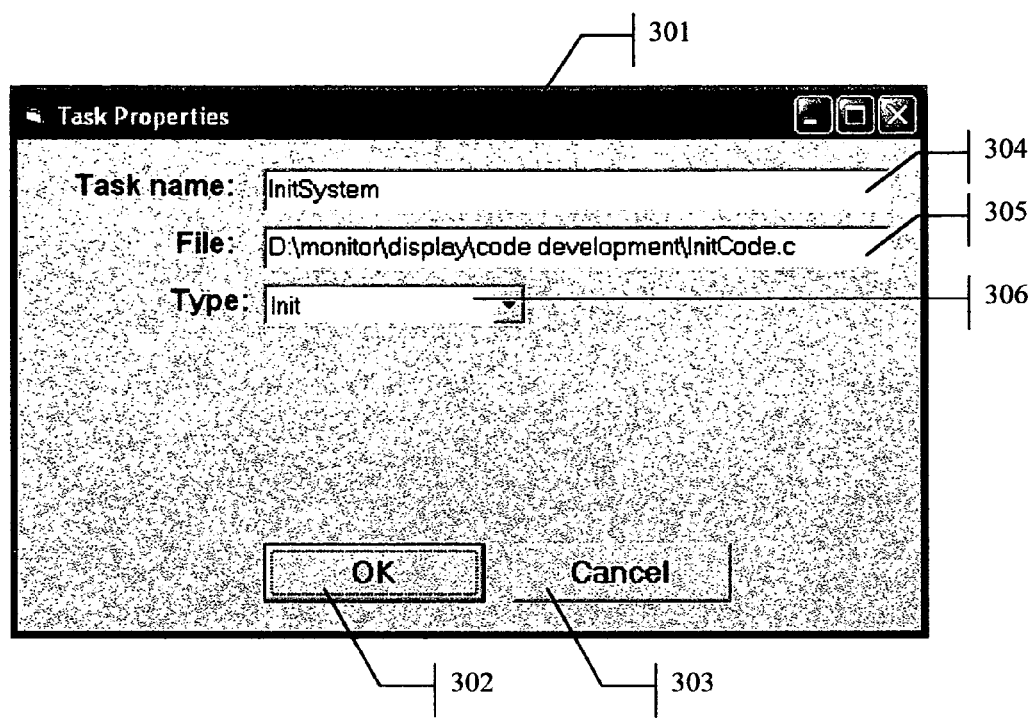
FIG. 3 shows a graphical user interface for specifying properties of an INIT task.

The present invention provides a "synthesized" RTOS that automates the process of creating an RTOS. One embodiment of the present invention includes a graphical user interface (GUI) for interacting with the human programmer or user. Such a GUI can be created, for example, by using a commercially available toolkit for use on a personal computer or a workstation. FIG. 3 shows a dialog box 301 in the GUI for specifying a software task.

Dialog box 301 queries the user to provide the properties of each software task. In this embodiment, five task types are supported: a) INIT task; b) F-LOOP task; c) P-LOOP task; d) CALL task; and e) ISR task. Three types of tasks, F-LOOP, P-LOOP, and CALL can be cooperative or preemptive tasks as described later in this document.

An INIT task is a type of task that is executed once by the task management code upon initialization of the system and that is called again only when the system is reinitialized. FIG. 3 shows a dialog box 301 of a GUI for the user to enter information about an INIT task. The OK button 302 is used to signal that the user has completed entering information, at which time the information recorded in dialog box 301 is stored in a file on the user's system. The Cancel button 303 is used to signal that the information should be discarded. The name of the task is entered into textbox 304. The name of the file containing the task is entered in textbox 305. The type of the file is selected from the choices in the pulldown list 306. In this example, the task is an INIT task.

Figure 4:
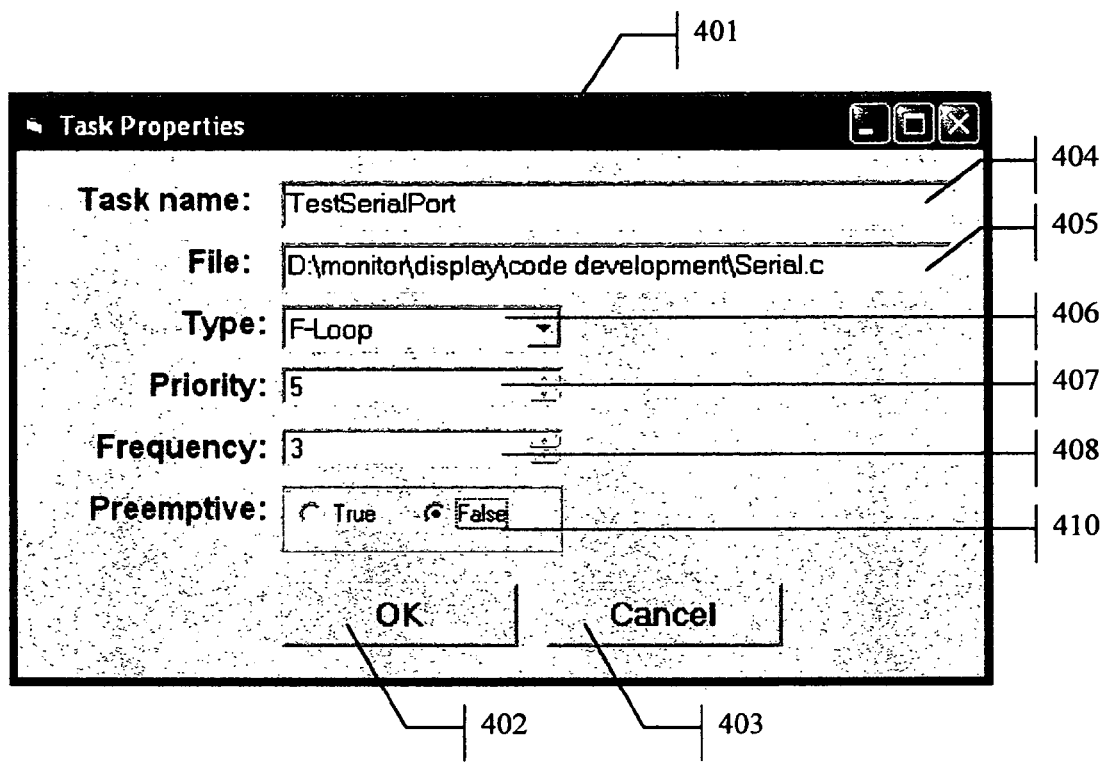
FIG. 4 shows a graphical user interface for specifying properties of an F-LOOP task.

An F-LOOP task is a type of task that is executed by the task management code at a specified, relative frequency. For example, one F-LOOP task may be called 5 times per second while another F-LOOP task may be called 10 times per second. The relative frequencies of F-LOOP tasks are more important than the specified number of times per second that they are executed. FIG. 4 shows a dialog box 401 for the user to enter information about an F-LOOP task. The OK button 402 is used to signal that the user has completed entering information, at which time the information recorded in dialog box 401 is stored in a file on the user's system. The Cancel button 403 is used to signal that the information should be discarded. The name of the task is entered into textbox 404. The name of the file containing the task is entered in textbox 405. The type of the file is selected from the choices in the pulldown list 406. In this example, the task is an F-LOOP task. The priority of the task is selected from the choices in list 407. Task priority is described later in this detailed description. The relative frequency of the task is selected from the list 408. In this embodiment, a value of 3 means that the task will be executed once for every 3 times through a loop that executes all F-LOOP tasks. The user specifies whether or not the task is preemptive by selecting true or false for option box 410. Preemptive tasks and cooperative (non-preemptive) tasks are described later in this detailed description.

Figure 5:
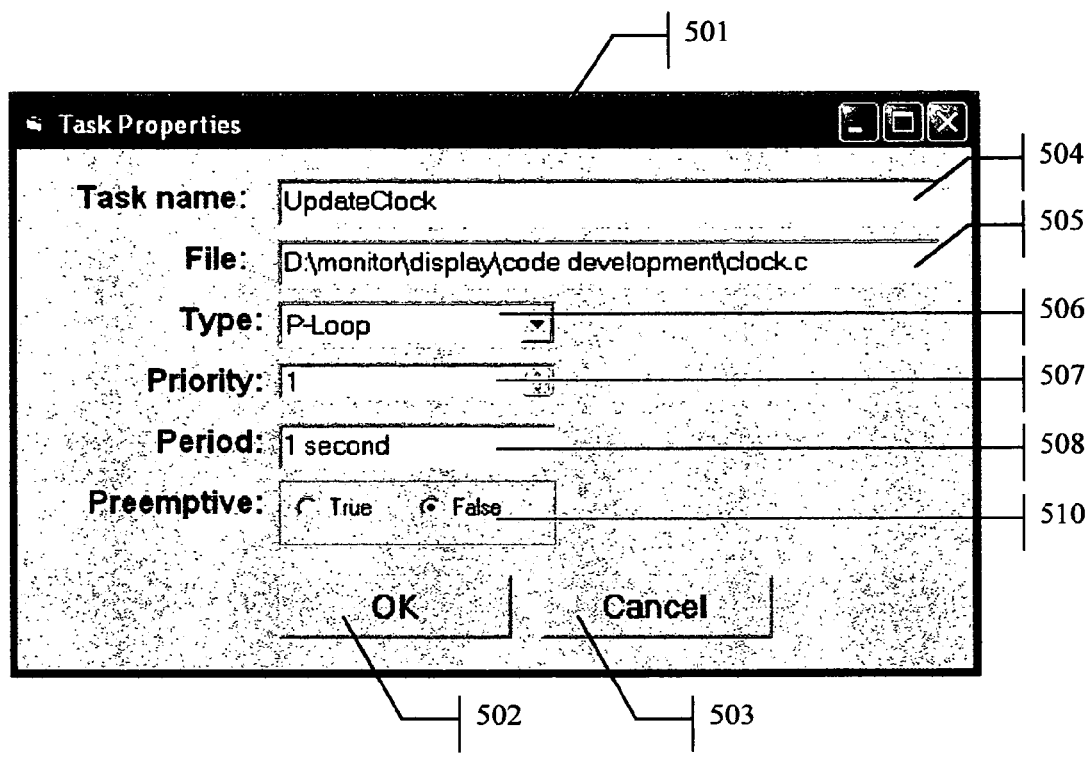
FIG. 5 shows a graphical user interface for specifying properties of a P-LOOP task.

A P-LOOP task is a type of task that is executed by the task management code at a minimum specified period of time. FIG. 5 shows a dialog box 501 for the user to enter information about a P-LOOP task. The OK button 502 is used to signal that the user has completed entering information, at which time the information recorded in dialog box 501 is stored in a file on the user's system. The Cancel button 503 is used to signal that the information should be discarded. The name of the task is entered into textbox 504. The name of the file containing the task is entered in textbox 505. The type of the file is selected from the choices in the pulldown list 506. In this example, the task is a P-LOOP task. The priority of the task is selected from the choices in list 507. The period of the task in entered in textbox 508. In this embodiment, a value of 1 second means that minimum time between complete executions of the task will be 1 second, scheduled by the task management code. The user specifies whether or not the task is preemptive by selecting a true or false for option box 510.

Figure 6:
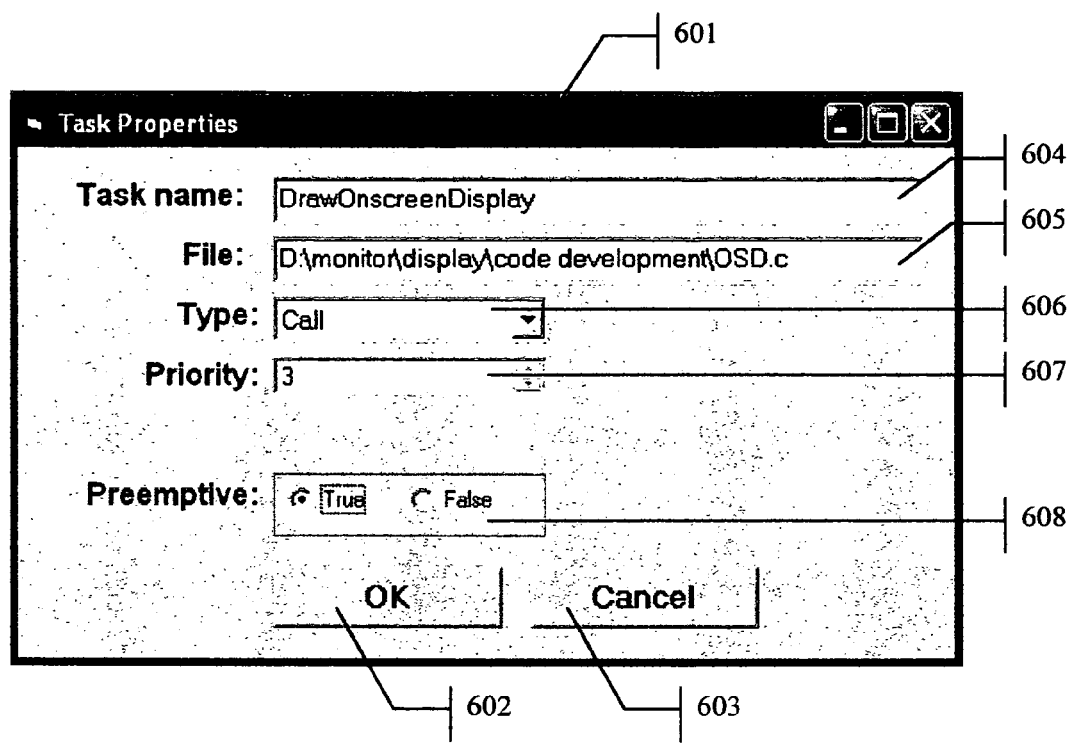
FIG. 6 shows a graphical user interface for specifying properties of a CALL task.

A CALL task is a type of task that is executed by the task management code only when another task has requested it. FIG. 6 shows a dialog box 601 for the user to enter information about a CALL task. The OK button 602 is used to signal that the user has completed entering information, at which time the information recorded in dialog box 601 is stored in a file on the user's system. The Cancel button 603 is used to signal that the information should be discarded. The name of the task is entered into textbox 604. The name of the file containing the task is entered in textbox 605. The type of the file is selected from the choices in the pulldown list 606. In this example, the task is a CALL task. The priority of the task is selected from the choices in list 607. The user specifies whether the task is preemptive by selecting true or false for option box 608.

Figure 7:
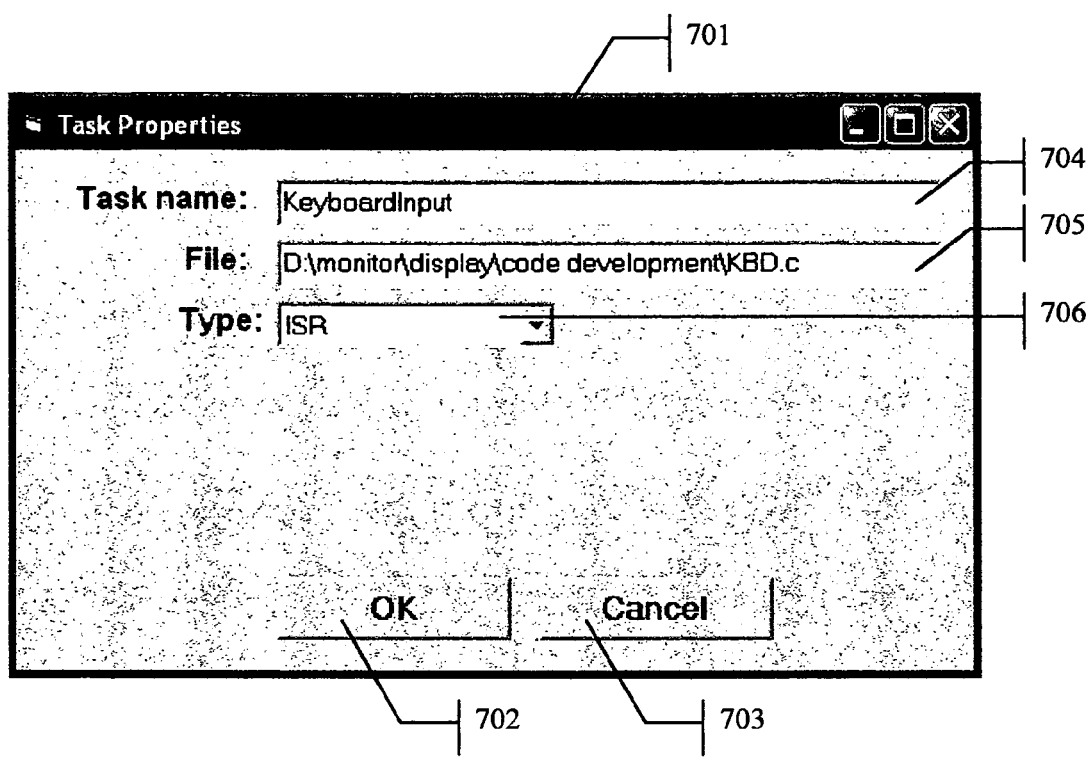
FIG. 7 shows a graphical user interface for specifying properties of an ISR task.

An ISR task is a type of task that is executed by the processor in response to a hardware signal asserted to the system. FIG. 7 shows a dialog box 701 for the user to enter information about an ISR task. The OK button 702 is used to signal that the user has completed entering information, at which time the information recorded in dialog box 701 is stored in a file on the user's system. The Cancel button 703 is used to signal that the information should be discarded. The name of the task is entered into textbox 704. The name of the file containing the task is entered in textbox 705. The type of the file is selected from the choices in the pulldown list 706. In this example, the task is an ISR task. The priority of the task is determined by the hardware of the system.

The priority of a task informs the task management code which of multiple tasks that are scheduled to run simultaneously should be executed. Tasks with higher priority values will be executed before those with lower priority values. When multiple tasks with identical priority values are scheduled to execute at the same time, the task management code can choose any of these multiple tasks arbitrarily.

A preemptive task is interrupted by the task management code at specific intervals to prevent the task from blocking other tasks from executing. A timer interrupt is set up by the task management code to interrupt execution of the preemptive task at regular intervals. At the beginning of each interval, the timer interrupt service routine checks whether the preemptive task was still executing before the timer interrupt. When a preemptive task has been executing for a set amount of time, and has not completed or it has not allowed another task to execute, the timer interrupt service routine transfers control back to the task management code. This control transfer saves the states of the processor and the preemptive task, and allows another task to execute. The task management code will later restore the states of the processor and the preemptive task so that the preemptive task can continue to execute where it previously left off.

A cooperative task, or non-preemptive task, is one that stores its own state and returns control to the task management code so that the task does not need to be interrupted by a timer. A non-preemptive task cooperates with other tasks and with the task management code so that the task does not prevent other tasks from executing. When the task management code executes a cooperative task, the cooperative task restores its own state and begins execution where it left off.

This embodiment of the present invention takes the information about the embedded system that is provided by the user and synthesizes source code for system calls within each task. This embodiment of the present invention also takes the information about the embedded system that is provided by the user, combines it with the requirements of each software task, based on the source code of the software task, and synthesizes source code for the real-time operating system. The description below explains the source code structures and subroutines that are synthesized in this process.

In this embodiment of the present invention, each synthesized task has an identifier (ID) associated with it. Each synthesized task also has an associated task context block (TCB) structure associated with it in memory. As shown in FIG. 8, a TCB contains several fields that represent the current task state 801, the ID 802 of the task that called it, the parameters 803-804 that were passed to the task, and a return value 805, if the task returns a value. Note that there may be any number of input parameters and are represented in the figure as a series of dots between parameter 1 804 and parameter n 805. The descriptions below refer to tasks that are synthesized by this embodiment of the present invention. This embodiment places the appropriate code to manipulate TCBs into each task, thus producing a synthesized task that acts as described below.

The TCBs are queued in a TCB Queue (TCBQ) as shown in FIG. 8. One TCB 811 in the TCBQ is represented by fields 801 through 805 while another TCB 812 is represented by fields 806 through 810. Each time a task is called, a new TCB is loaded at the tail of the queue. The TCB at the head of the TCBQ is called the current TCB.

One task can request that another task be executed by the task management code. This requesting process is referred to as one task "calling" another task. There are two kinds of tasks—blocking tasks and non-blocking tasks. When any task A calls a blocking task B, execution of task A does not continue until execution of task B has completed. When any task A calls a non-blocking task B, execution of task A continues execution regardless of whether task B has started or completed. Both types of tasks and how they manipulate TCBs and TCBQs are described below.

Figure 10:
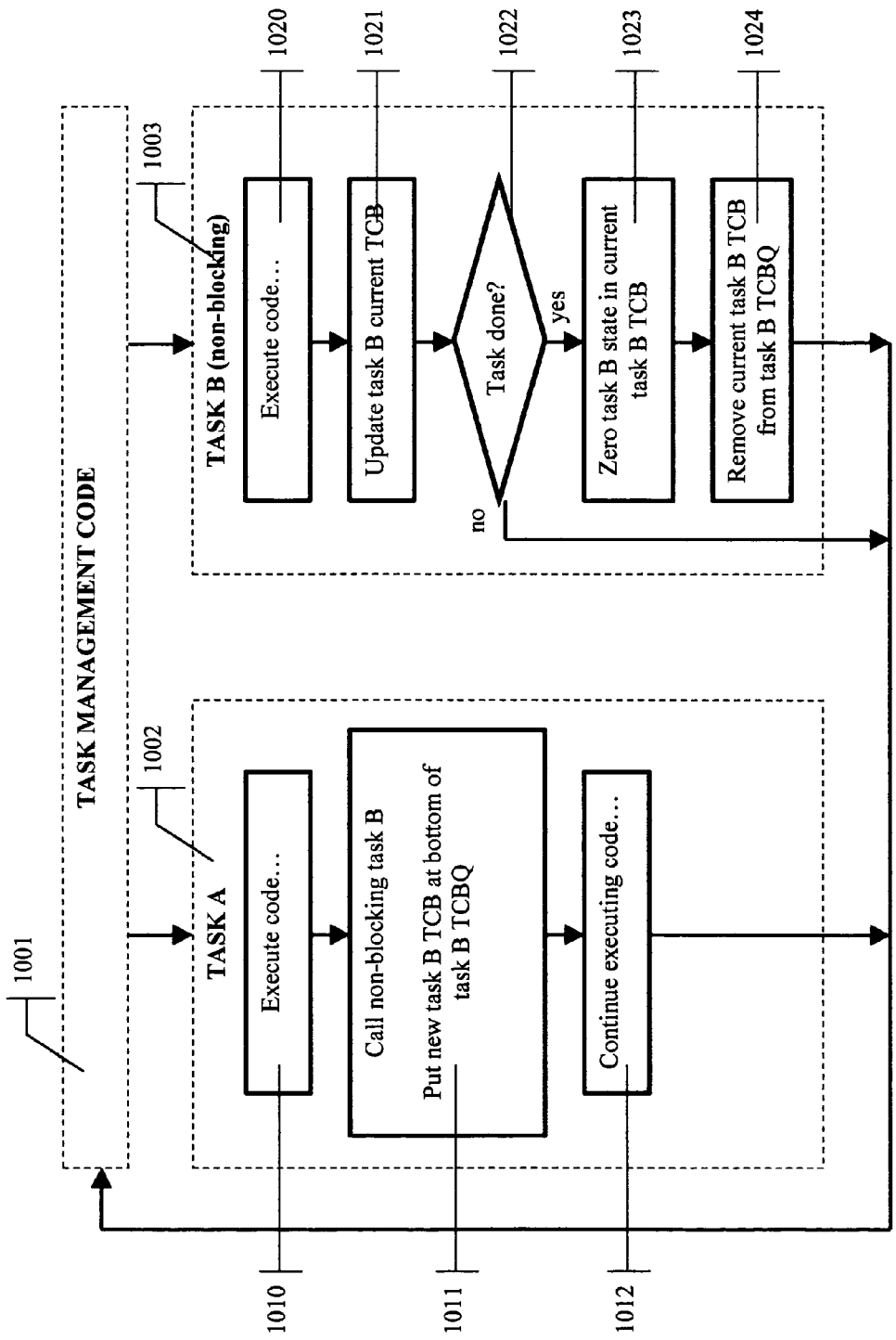
FIG. 10 is a flowchart showing how the preferred embodiment implements task A calling non-blocking task B.

As shown in FIG. 10, task A 1002, which can be either blocking or non-blocking, calls non-blocking task B 1003. Task A 1002 executes some code as shown in block 1010. In order for task A 1002 to request that task B 1003 be executed, as shown in block 1011, task A 1002 puts a new task B TCB at the tail of the task B TCBQ and task A 1002 continues executing as shown in block 1012. This new task B TCB contains the parameters that task A 1002 passes to task B 1003. As shown, this new task B TCB has a '1' in the task state field to represent the first state of task B 1003. This new task B TCB has the ID of task A 1002 in the field for the calling task ID. When control is returned to the task management code 1001 by task A 1002, and the task management code 1001 determines that task B 1003 can execute, the task management code 1001 checks whether there are any TCBs in task B's TCBQ. If there are TCBs in task B's TCBQ, the task management code 1001 transfers control to task B 1003, which begins executing code as shown in block 1020. As task B 1003 executes code, task B 1003 updates the task state in its current TCB as shown in block 1021. When task B 1003 completes, as shown in block 1022, task B 1003 writes a zero into the task state field of its current TCB, as shown in block 1023, and removes its current TCB from the TCBQ as shown in block 1024. If another TCB remains in task B's TCBQ, this remaining TCB is now at the head of task B's TCBQ and thus becomes the current task B TCB. Note that task A 1002 and task B 1003 can return control to task management code 1001 many times during execution and task management code 1001 can return control to task A 1002 and task B 1003 many times during execution before either task A 1002 or task B 1003 has completed.

Figure 11:
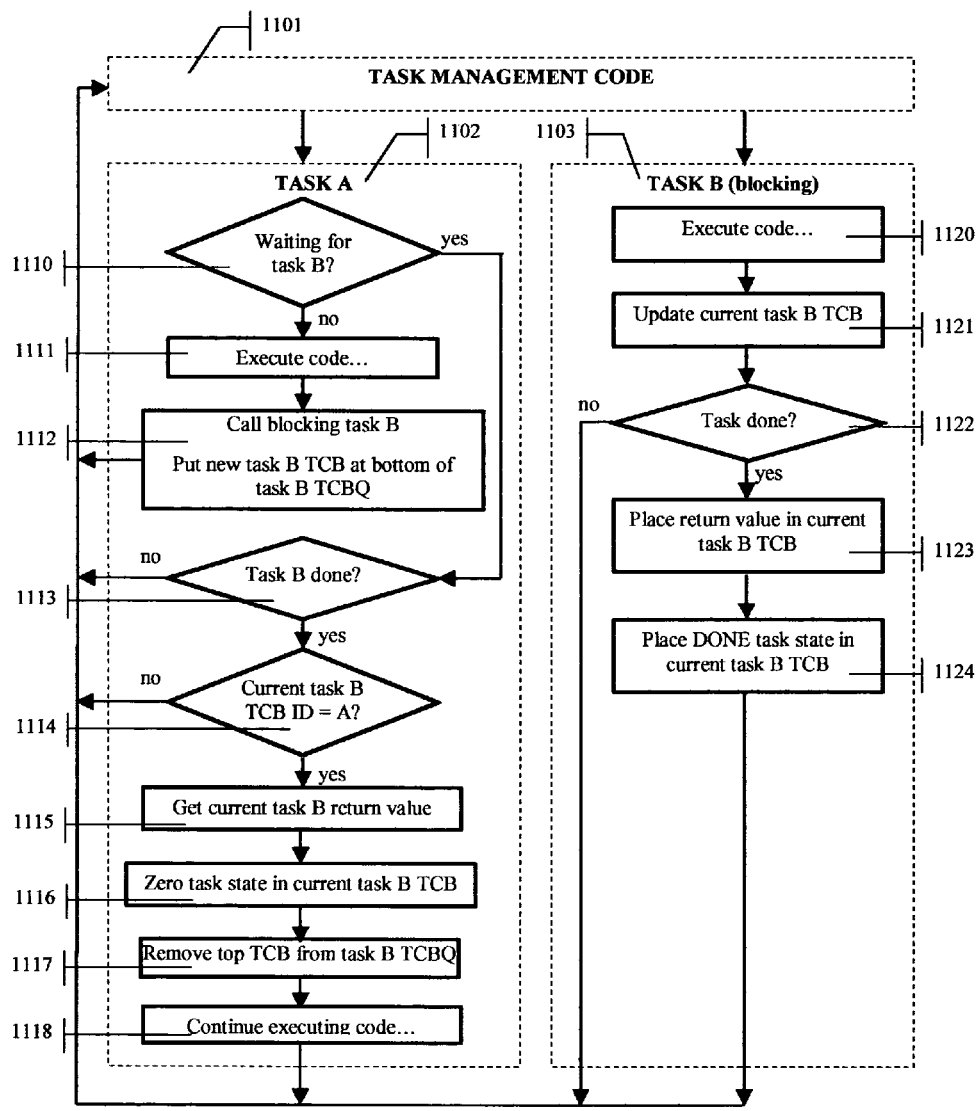
FIG. 11 is a flowchart showing how the preferred embodiment implements task A calling blocking task B.

As shown in FIG. 11, task A 1102, which can be blocking or non-blocking, calls blocking task B 1103. Task A 1102 checks whether it is waiting for task B 1103 as shown in block 1110. If not, task A 1102 executes some code as shown in block 1111. In order for task A 1102 to request that task B 1103 be executed, as shown in block 1112, task A 1102 calls blocking task B 1103 by putting a new task B TCB at the tail of the task B TCBQ and immediately transfers control to the task management code 1101. This new task B TCB contains the parameters that task A 1102 passes to task B 1103. This new task B TCB has a task state of '1' to represent the first state of task B 1103. This new task B TCB has the ID of task A 1102 in the field for the calling task ID. When the task management code 1101 determines that task B 1103 can execute, the task management code 1101 checks whether there are any TCBs in task B's TCBQ. If there are TCBs in task B's TCBQ, the task management code 1101 transfers control to task B 1103. Task B 1103 executes some code as shown in block 1120 and updates the task state in its current TCB as shown in block 1121. Task B 1122 can transfer control back to the task management code at any time as shown in block 1122. When task B 1103 completes, it places the return value, if any, in its current TCB as shown in block 1123, places a DONE value in the task state field in the current task B TCB as shown in block 1124, and returns control to the task management code 1101. When the task management code 1101 determines that task A 1102 can execute, the task management code 1101 checks whether there are any TCBs in task A's TCBQ. If there are TCBs in task A's TCBQ, the task management code 1101 transfers control to task A 1102. When task A 1102 resumes execution, task A checks whether it is currently waiting for task B to complete as shown in block 1110. If task A 1102 is waiting for task B 1103 to complete, execution is transferred to block 1113, where task A 1102 checks whether task B 1103 is done. Checking is performed by examining the current task B TCB and looking for the DONE flag in the task state field. If task B 1103 is not done, control is transferred to the task management code 1101 as shown in block 1113. If task B 1103 is done, task A 1102 checks whether the current task B TCB ID field matches the task A ID as shown in block 1114. If there is no match, task A 1102 transfers control back to the task management code 1101, because some other task is waiting for task B 1103 to complete. If there is a match, task A 1102 obtains the return value from task B 1103 that is in the current task B TCB as shown in block 1115. Task A 1102 then writes a zero into the task state in the current task B TCB as shown in block 1116 and removes the current task B TCB from task B's TCBQ as shown in block 1117. If another TCB remains in task B's TCBQ, this remaining TCB is now the head of task B's TCBQ and thus becomes the current task B TCB. Note that task A 1102 and task B 1103 can return control to task management code 1101 many times during execution and task management code 1101 can return control to task A 1102 and task B 1103 many times during execution before either task A 1102 or task B 1103 has completed.

When this embodiment of the invention generates code, it synthesizes software routines to manipulate TCBs and TCBQs, which are described in FIG. 9. These routines are included in the synthesized code that is output by this embodiment of the invention.

Figure 12:
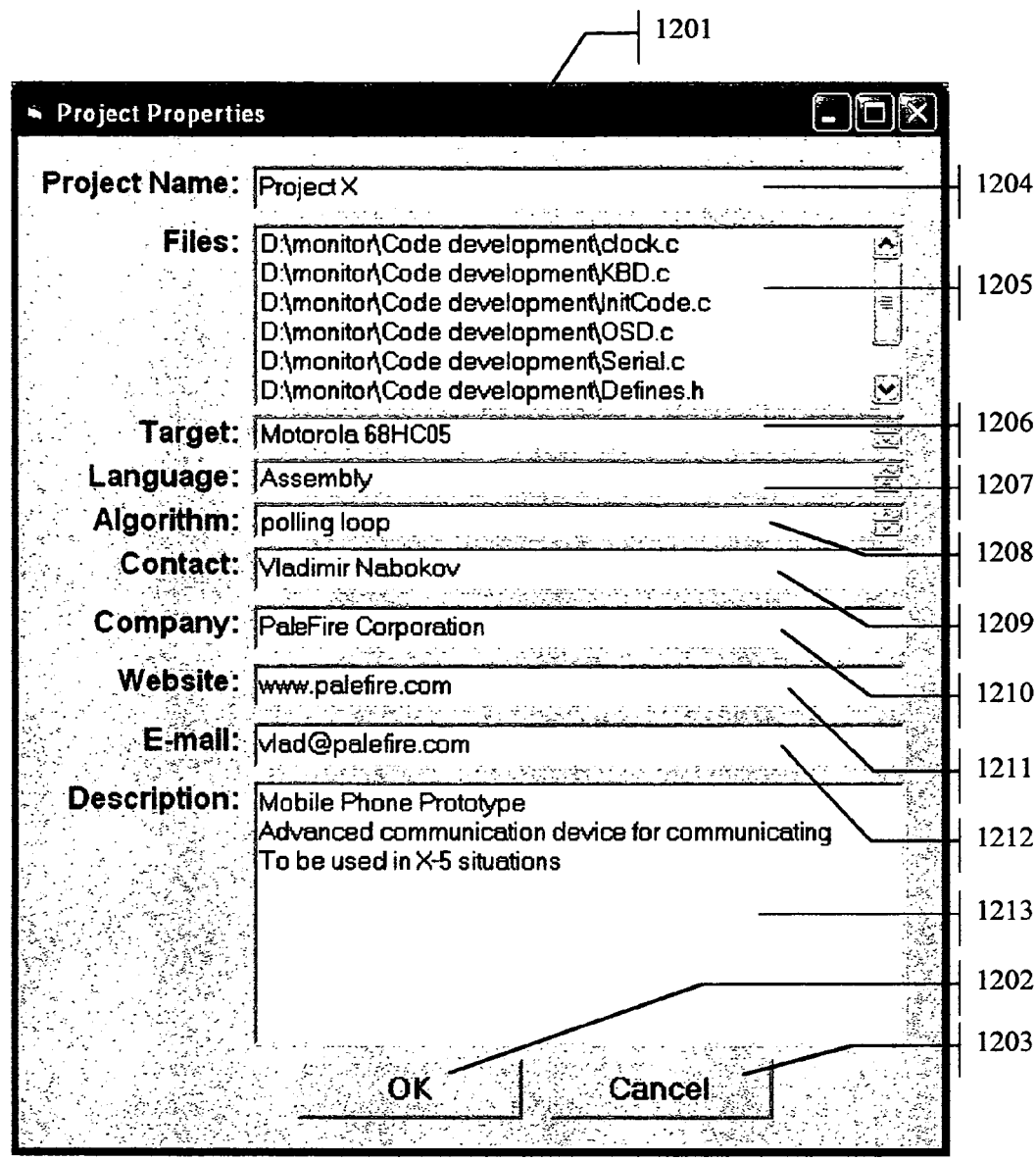
FIG. 12 shows a graphical user interface (GUI) for specifying properties of a project.

FIG. 12 shows a dialog box 1201 in which the user enters information about a project for which an RTOS will be synthesized. The OK button 1202 is used to signal that the user has completed entering information, at which time the information recorded in dialog box 1201 is stored in a file on the user's system. The Cancel button 1203 is used to signal that the information should be discarded. The name of the project is entered into textbox 1204. The list of the files in the project is entered in listbox 1205. The target processor is selected from the choices in the pulldown list 1206. The source code language of the files is selected from the choices in the pulldown list 1207. The algorithm to be used for the task management code is selected from listbox 1208. The name of the contact person for the project is entered into textbox 1209. The name of the company is entered into textbox 1210. The website of the company is entered into textbox 1211. The email for contact person is entered into textbox 1212. A description of the project is entered into the multi-line textbox 1213.

Figure 13A:
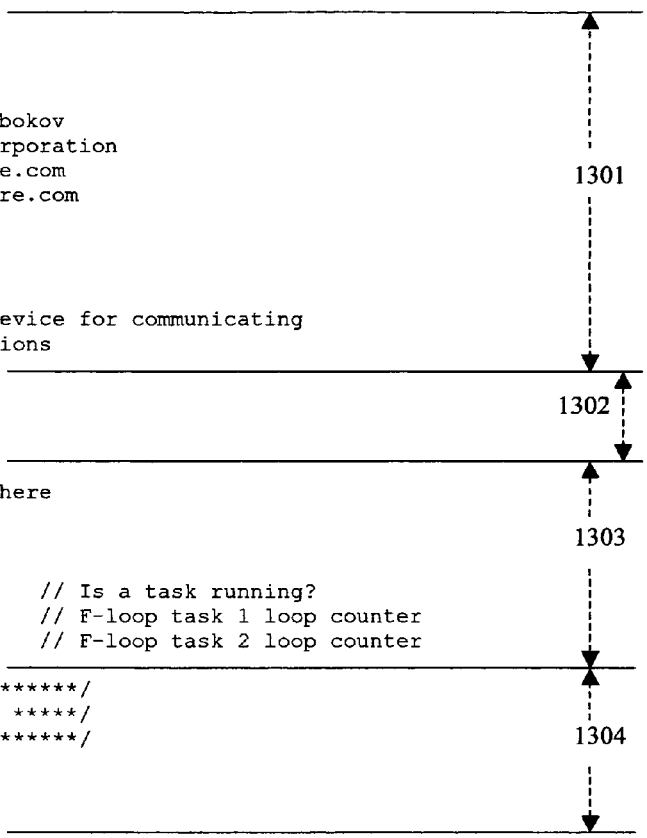
FIG. 13 (parts a, b, and c) shows synthesized task management code.

Using the information entered into dialog box 1201 shown in FIG. 12, this embodiment of the invention generates task management code as shown in FIG. 13a, FIG. 13b, and FIG. 13c, which represent one continuous section of code. In this embodiment, the task management code uses a polling loop scheduling algorithm that executes each task in the system in an order determined at code generation time. Those of ordinary skill in the art will recognize that many other types of scheduling algorithms may be implemented in the synthesized task management code, including priority-based scheduling, relative frequency scheduling, fixed timing scheduling, and combinations of these algorithms. The task management code includes a header code section 1301 to identify the project, the project leader, and other user-defined descriptive information about the project. Code section 1302 has statements for including special files into the code that define and initialize global variables, constants, macros, and other code statements that are used in the code. The executable task management code begins with the main( ) routine starting in code section 1303 where local variables are defined and initialized. Code section 1304 calls all of the INIT tasks that are executed only once upon initialization of the system. Code section 1304 shows source code for executing three INIT tasks.

In FIG. 13b, code section 1305 is the start of the polling loop that executes indefinitely. Code section 1306 contains the code within the RTOS polling loop that executes each F-LOOP task. Each F-LOOP task has a counter that is decremented for each loop of the main polling loop. When the value of the counter reaches zero, the F-LOOP task is executed. After the task is executed, the counter is set to its maximum value. Code section 1306 shows source code for executing two F-LOOP tasks.

In FIG. 13c, code section 1307 contains the code for executing P-LOOP tasks. The current TCB for P-LOOP task is checked to whether it is not idle. If the task is not idle, the task management code executes the task. Note that P-LOOP tasks are called by the timer ISR that periodically sets the TCB for each P-LOOP task according to the time period set by the user, as shown in FIG. 14. Code section 1307 shows source code for executing two P-LOOP tasks.

In code section 1308, all of the CALL tasks are executed only if they have been called by another task. The state variable of each CALL task is checked. If the state variable is non-zero, meaning that the task has been called by another task or that its execution has been paused previously, the task is executed. Otherwise, the task is not executed. Code section 1308 shows source code for executing two CALL tasks.

FIG. 14a and FIG. 14b are two sections of continuous code that make up the timer interrupt service routine that is synthesized by this embodiment of the present invention. This routine is executed at regular intervals by the processor. Code section 1401 has statements for including special files into the code that define and initialize global variables, constants, macros, and other code statements that are used in the code. The executable section of the timer ISR code begins with code section 1402, which calls the P-LOOP tasks. Each P-LOOP task has a counter associated with it. The counter is decremented each time that the timer ISR is executed. When the counter reaches zero, the code calls the P-LOOP task by putting a new TCB into its TCBQ. The counter for that task is then set to its maximum value. Note that the actual execution of the task takes place in the polling loop, shown in code section 1307 of FIG. 13c. The code in section 1402 shows two P-LOOP tasks. The first task takes three input parameters, a, b, and c, that are placed in the TCB. The second task takes no input parameters. Note that this same method of calling a P-LOOP task is used when one task calls a CALL task.

Code section 1403 shows code for executing preemptive tasks. Each preemptive task has an on-time and an off-time, specifying how often to execute the task and how long the task can be allowed to execute before it must be paused. Each task has an associated counter that is decremented each time the timer ISR is executed. When the counter reaches a count corresponding to the time to call the task, a typical context switch is performed that saves current state of the processor to memory while a previous state of the processor is restored from the last time that the task was executing. This context switch causes the task to resume executing from the point that it left off. One of ordinary skill in the art of computer science understands what is involved with a typical context switch of this kind. When the counter reaches a count corresponding to the time to pause the task, a typical context switch is performed that saves current state of the processor to memory while a previous state of the processor is restored from the last time before the task began executing. This context switch causes the task to pause execution. One of ordinary skill in the art of computer science understands what is involved with a typical context switch of this kind. When the counter reaches zero, it is set to its maximum value.

Note that preemptive tasks may be F-LOOP tasks, P-LOOP tasks, or CALL tasks. Each preemptive task starts execution differently, but each task must be paused and restarted by the timer ISR.

Various modifications and adaptations of the operations that are described here would be apparent to those skilled in the art based on the above disclosure. Many variations and modifications within the scope of the invention are therefore possible. The present invention is set forth by the following claims.

I claim:

1. A method for developing a real-time operating system, comprising:
   specifying a set of n tasks, task(1) through task(n), to be scheduled for execution;
   specifying t init-tasks that are executed only once upon initial execution of a task scheduler, t being less than or equal to n;
   using a data processor to synthesize source code from commands embedded in source code to implement the task scheduler for controlling execution of said set of n tasks, the task scheduler further controlling one execution of each of said set of $\tau$ init-tasks, said synthesized source code being executable on a target system after compilation; and
   synthesizing source code from commands embedded in source code to control execution of said set of t init-tasks, wherein synthesizing source code from commands embedded in source code includes generating new source code based on the commands embedded in source code.

2. The method of claim 1) including specifying f f-loop tasks, each having an associated integer value c(i) for i ranging from 1 to f and f being less than or equal to n, said task scheduler including a continuously executing loop such that each f-loop task executes exactly once every c(i) times that the loop is executed.

3. The method of claim 1) including specifying p p-loop tasks, each having an associated integer value t(i) for i ranging from 1 to p and p being less than or equal to n, the number t(i) representing a number of regular time units, said task scheduler including a timer that schedules each p-loop task i to be executed approximately once every t(i) time units.

4. The method of claim 1) including specifying c call-tasks, c being less than or equal to n, said task scheduler scheduling a call-task when another task requests that said call-task be executed.

5. The method of claim 1) including specifying r preemptive-tasks, r being less than or equal to a, said task scheduler including a timer mechanism that counts a specified period of time at which time if a preemptive-task is currently executing, the task's state is stored and execution is given to said task scheduler to schedule another task until a later time when the task scheduler restores the state of said preemptive-task and execution of said preemptive-task is continued.

6. The method of claim 1) where tasks are given priority values such that whenever the task scheduler chooses between scheduling multiple tasks, all of which being ready to be executed, said task scheduler chooses from among those tasks that have the highest priority values.

7. An apparatus for developing a real-time operating system comprising:
   a computer;
   a non-transitory computer readable medium in data communication with the computer, the computer readable medium including a software synthesis program stored thereon, which when executed by the computer causes the computer to specify a set of u tasks, task(1) through task(n), to be scheduled for execution; specify t init-tasks that are executed only once upon initial execution of a task scheduler, t being less than or equal to n; synthesize source code from commands embedded in source code to implement the task scheduler for controlling execution of said set of n tasks, the task scheduler further controlling one execution of each of said Set of t init-tasks, said synthesized source code being executable on a target system after compilation; and
   synthesize source code from commands embedded in source code to control execution of said set of t init-tasks, wherein synthesizing source code from commands embedded in source code includes generating new source code based on the commands embedded in source code.

8. The apparatus of claim 7 being configured to specify f f-loop tasks, each having an associated integer value c(i) for i ranging from 1 to f and f being less than or equal to n, said task scheduler including a continuously executing loop such that each f-loop task executes exactly once every c(i) times that the loop is executed.

9. The apparatus of claim 7 being configured to specify p p-loop tasks, each having an associated integer value t(i) for i ranging from 1 to p and p being less than or equal to n, the number t(i) representing a number of regular time units, said task scheduler including a timer that schedules each p-loop task i to be executed approximately once every t(i) time units.

10. The apparatus of claim 7 being configured to specify c call-tasks, c being less than or equal to n, said task scheduler scheduling a call-task when another task requests that said call-task be executed.

11. The apparatus of claim 7 being configured to specify r preemptive-tasks, r being less than or equal to n, said task scheduler including a timer mechanism that counts a specified period of time at which time if a preemptive-task is currently executing, the preemptive-task's state is stored and execution is given to said task scheduler to schedule another task until a later time when the task scheduler restores the state of said preemptive-task and execution of said preemptive-task is continued.

12. The apparatus of claim 7 wherein tasks are given priority values such that whenever the task scheduler chooses between scheduling multiple tasks, all of which being ready to be executed, said task scheduler chooses from among those tasks that have the highest priority values.

13. An apparatus for developing a real-time operating system comprising:
   a computer;
   a non-transitory computer readable medium in data communication with the computer, the computer readable medium including a software synthesis program stored thereon, the software synthesis program including:
   means for specifying a set of n tasks, task(1) through task (n), to be scheduled for execution;

means for specifying t init-tasks that are executed only once upon initial execution of a task scheduler, t being less than or equal to n;

means for synthesizing source code from commands embedded in source code to implement the task scheduler for controlling execution of said set of n tasks, the task scheduler further controlling one execution of each of said set of t init-tasks, said synthesized source code being executable on a target system after compilation; and means for synthesizing source code from commands embedded in source code to control execution of said set of t init-tasks, wherein the means for synthesizing source code from commands embedded in source code includes means for generating new source code based on the commands embedded in source code.

14. The apparatus of claim 13 including means for specifying f f-loop tasks, each having have an associated integer value c(i) for i ranging from 1 to f and f being less than or equal to n, said task scheduler including a continuously executing mop such that each f-loop task executes exactly once every c(i) times that the loop is executed.

15. The apparatus of claim 13 including means for specifying p p-loop tasks, each having an associated integer value t(i) for i ranging from 1 to p and p being less than or equal to n, the number t(i) representing a number of regular time units, said task scheduler including a timer that schedules each p-loop task i to be executed approximately once every t(i) time units.

16. The apparatus of claim 13 including means thr specifying c call-tasks, c being less than or equal to n, said task scheduler scheduling a call-task when another task requests that said call-task be executed.

17. The apparatus of claim 13 including means for specifying r preemptive-tasks, r being less than or equal to n, said task scheduler including a timer mechanism that counts a specified period of time at which time if a preemptive-task is currently executing, the preemptive-task's state is stored and execution is given to said task scheduler to schedule another task until a later time when the task scheduler restores the state of said preemptive-task and execution of said preemptive-task is continued.

18. The apparatus of claim 13 wherein tasks are given priority values such that whenever the task scheduler chooses between scheduling multiple tasks, all of which are ready to be executed, said task scheduler chooses from among those tasks that have the highest priority values.

19. A non-transitory machine-readable medium embodying instructions which, when executed by a machine, cause the machine to:

specify a set of n tasks, task(1) through task(n), to be scheduled for execution:

specify t init-tasks that are executed only once upon initial execution of a task scheduler, being less than or equal to n;

synthesize source code from commands embedded in source code to implement the task scheduler for controlling execution of said set of n tasks, the task scheduler further controlling one execution of each of said set of t init-tasks, said synthesized source code being executable on a target system after compilation; and synthesize source code from commands embedded in source code to control execution of said set of t init-tasks, wherein synthesizing source code from commands embedded in source code includes generating new source code based on the commands embedded in source code.

20. The machine-readable medium of claim 19 being further configured to specify f f-loop tasks, each having an associated integer value c(i) for i ranging front 1 to f and f being less than or equal to n, said task scheduler including a continuously executing loop such that each f-loop task executes exactly once every c(i) times that the loop is executed.

21. The machine-readable medium of claim 19 being further configured to specify p p-loop tasks, each having an associated integer value t(i) for i ranging from 1 to p and p being less than or equal to n, the number t(i) representing a number of regular time units, said task scheduler including a timer that schedules each p-loop task i to be executed approximately once every t(i) time units.

22. The machine-readable medium of claim 19 being further configured to specify c call-tasks, c being less than or equal to n, said task scheduler scheduling a call-task when another task requests that said call-task be executed.

23. The machine-readable medium of claim 19 being further configured to specify r preemptive-tasks, r being less than or equal to n, said task scheduler including a timer mechanism that counts a specified period of time at which time if a preemptive-task is currently executing, the task's state is stored and execution is given to said task scheduler to schedule another task until a later time when die task scheduler restores the state of said preemptive-task and execution of said preemptive-task is continued.

24. The machine-readable medium of claim 19 wherein tasks are given priority values such that whenever the task scheduler chooses between scheduling multiple tasks, all of which being ready to be executed, said task scheduler chooses from among those tasks that have the highest priority values.

* * * * *

UNITED STATES PATENT AND TRADEMARK OFFICE
CERTIFICATE OF CORRECTION

PATENT NO. : 7,882,488 B2
APPLICATION NO. : 10/688573
DATED : February 1, 2011
INVENTOR(S) : Robert M. Zeidman It is certified that error appears in the above-identified patent and that said Letters Patent is hereby corrected as shown below:

IN THE CLAIMS:

Column 9, Claim 1, line 33, change "τ init-tasks" to -- t init-tasks --.

Column 9, Claim 5, line 59, change "equal to a" to -- equal to n --.

Column 10, Claim 7, line 11, change "a set of u tasks" to -- a set of n tasks --.

Column 10, Claim 7, line 18, change "said Set" to -- said set --.

Column 10, Claim 14, line 21, change "executing mop" to -- executing loop --.

Column 10, Claim 16, line 30, change "means thr" to -- means for --.

Column 12, Claim 19, line 4, change "scheduler, being less" to -- scheduler, t being less --.

Column 12, Claim 20, line 20, change "ranging front" to -- ranging from --.

Column 12, Claim 23, line 42, change "when die task" to -- when the task --.

Signed and Sealed this
First Day of July, 2014

Michelle K. Lee
*Deputy Director of the United States Patent and Trademark Office*